US00RE36243E

United States Patent [19]

Rawson et al.

[11] E Patent Number: Re. 36,243

[45] Reissued Date of Patent: Jul. 6, 1999

[54] COULTER WHEEL ASSEMBLY INCLUDING APPLYING DRY OR LIQUID FERTILIZER

[75] Inventors: Ray Rawson; Allen Rawson, both of Farwell, Mich.

[73] Assignee: Unverferth Manufacturing Co., Inc., Kalida, Ohio

[21] Appl. No.: 08/807,963

[22] Filed: Feb. 28, 1997

Related U.S. Patent Documents

Reissue of:

[64] Patent No.: 4,987,841
Issued: [redacted] 1991
Appl. No.: 07/328,[redacted]
Filed: Mar. 24, 1989

U.S. Applications:

[63] Continuation of application No. 08/527,973, Sep. 14, 1995, abandoned, which is a continuation of application No. 07/952,433, Sep. 28, 1992, abandoned, which is a continuation-in-part of application No. 07/248,617, Sep. 26, 1988, abandoned.

[51] Int. Cl.[6] ..... A01C 23/02; A01C 5/06

[52] U.S. Cl. ..... 111/121; 111/123; 111/163

[58] Field of Search ..... 111/121, 140, 111/123, 84–87, 144, 165, 166, 193, 143, 6, 7, 81, 79, 73, 80, 83, 139, 163, 164, 167–169, 186–188; 172/567, 573, 574, 642, 646, 587, 595, 602, 774, 765

[56] References Cited

U.S. PATENT DOCUMENTS

| | | | |
|---|---|---|---|
| 330,022 | 11/1885 | Harter | 111/140 X |
| 376,089 | 1/1888 | Harter | 111/189 |
| 591,354 | 10/1897 | Jones . | |
| 1,330,451 | 2/1920 | Salmon . | |
| 1,642,908 | 9/1927 | Taylor . | |
| 3,362,361 | 1/1968 | Morrison . | |
| 3,507,233 | 4/1970 | Greig . | |
| 3,701,327 | 10/1972 | Krumholz | 111/140 X |
| 4,187,916 | 2/1980 | Harden et al. . | |
| 4,244,306 | 1/1981 | Peterson et al. . | |
| 4,289,081 | 9/1981 | Koronka . | |
| 4,628,840 | 12/1986 | Jacobson | 111/121 |

FOREIGN PATENT DOCUMENTS

| | | | |
|---|---|---|---|
| 1039118 | 9/1978 | Canada | 111/121 |

*Primary Examiner*—Danton D. DeMille
*Attorney, Agent, or Firm*—Henderson & Sturm

[57] ABSTRACT

A one pass seedbed preparation device having two fluted coulter assemblies per seedbed. The coulter assemblies are attachable to existing seed planting apparatus at their bias spring housings and are offset to provide self-cleaning action. Fertilizer delivery is then provided to an area surrounding the seedbed raised by the coulter wheels. The fertilizer may be delivered by a knife-blade cultivator, an injector or a rolling-disc drive.

14 Claims, 4 Drawing Sheets

Fig. 3
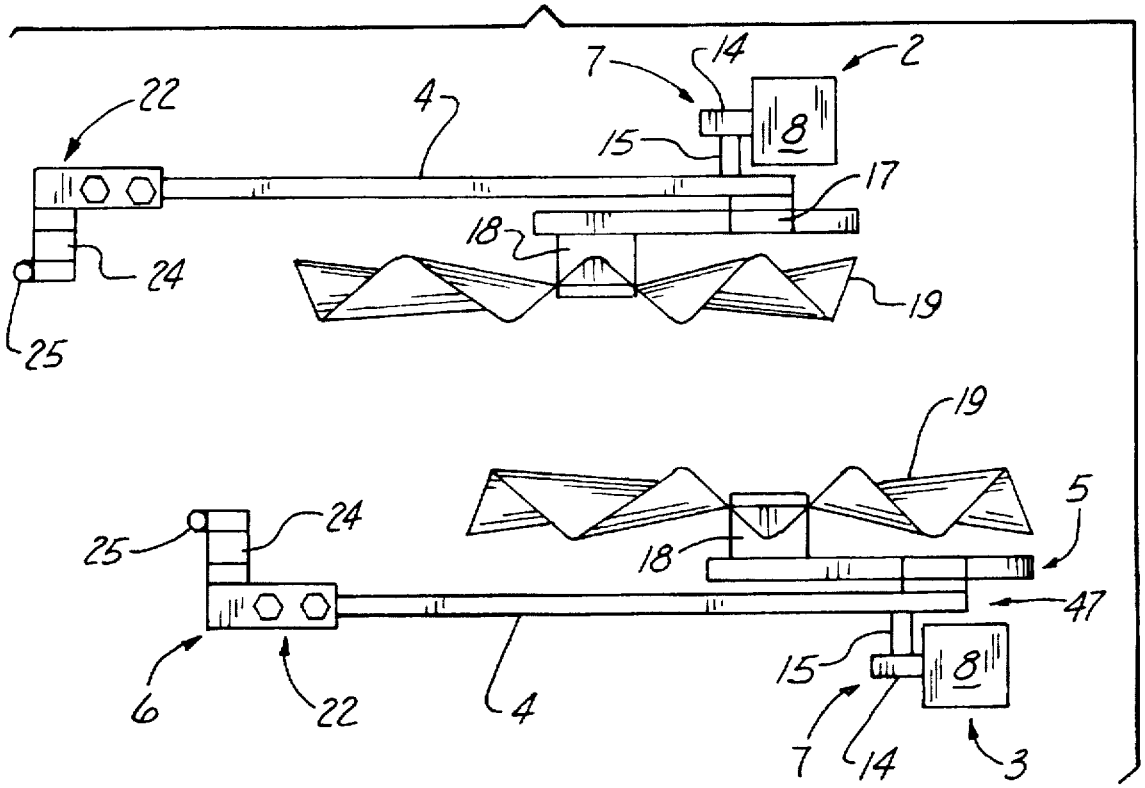
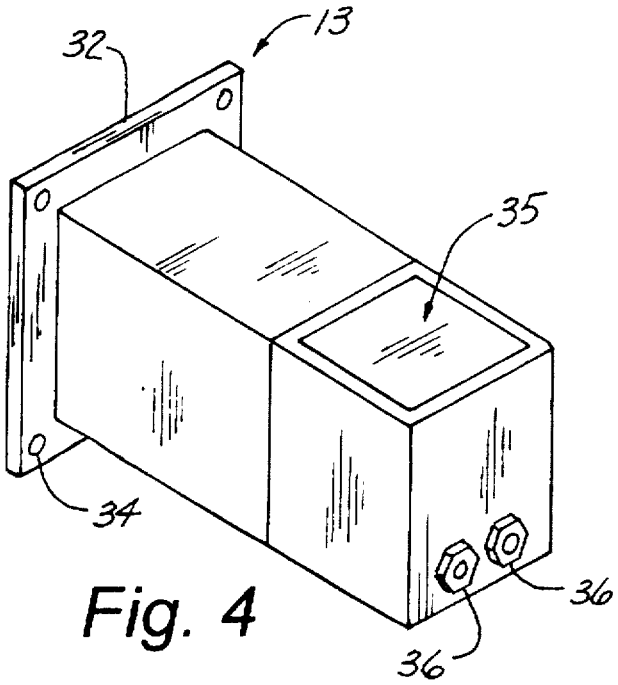
Fig. 4
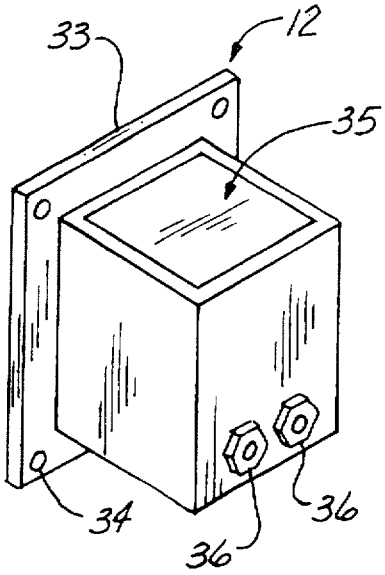
Fig. 5

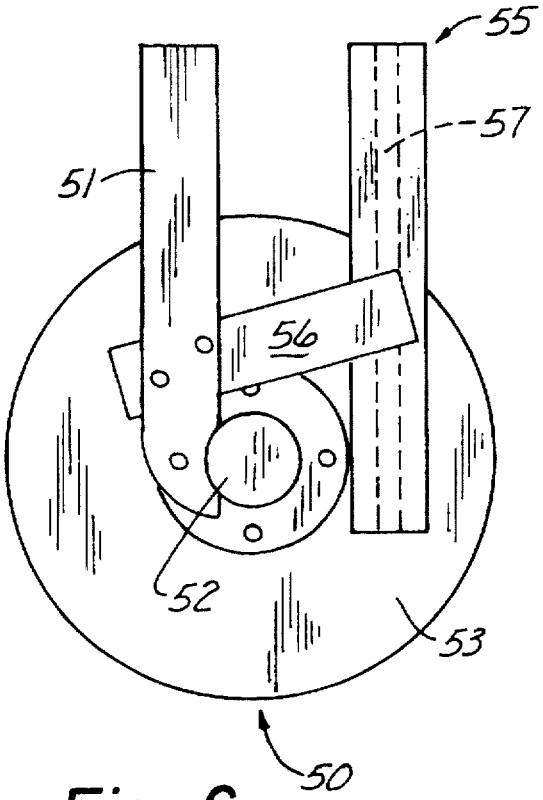
Fig. 6
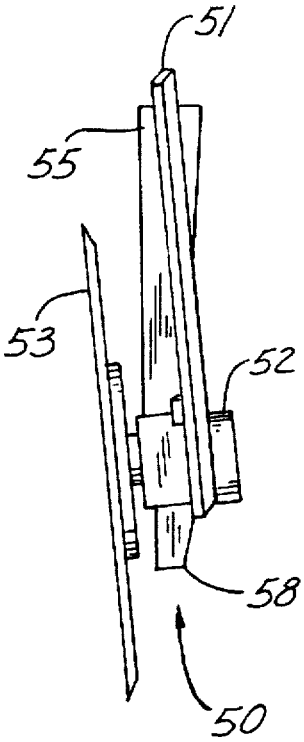
Fig. 7
Fig. 8
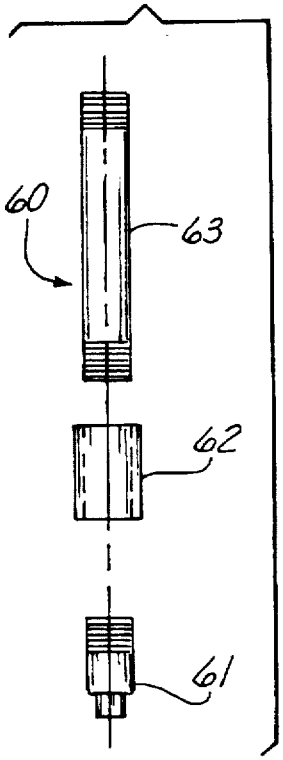
Fig. 9
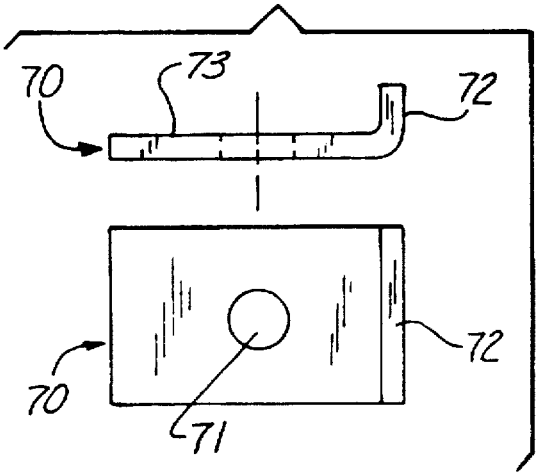
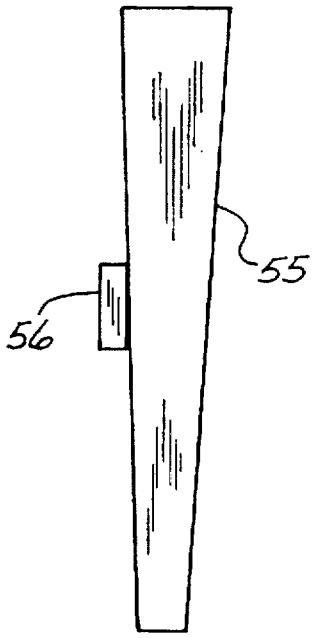
Fig. 10

COULTER WHEEL ASSEMBLY INCLUDING APPLYING DRY OR LIQUID FERTILIZER

Matter enclosed in heavy brackets [ ] appears in the original patent but forms no part of this reissue specification; matter printed in italics indicates the additions made by reissue.

CROSS REFERENCES TO RELATED APPLICATIONS

[This application is a Continuation-in-part application of Ser. No. 248,617, filed Sept. 26, 1988.] *This application is a continuation of Ser. No. 08/527,973 filed Sep. 14, 1995 now abandoned, which is a continuation of Ser. No. 07/952,433 filed Sep. 28, 1992 now abandoned, which is a re-issue of Ser. No. 07/328,482 filed Mar. 24, 1989 U.S. Pat. No. 4,987,841 which is a continuation-in-part of Ser. No. 07/248,617 filed Sep. 26, 1988 now abandoned.*

BACKGROUND OF THE INVENTION

1. Field of the Invention

The present invention relates generally to earth cultivation methods and apparatus. More particularly, the present invention relates to a seedbed preparation method and apparatus operable where minimum tillage is desired of soil covered by residue from previous plantings.

Such minimum tillage systems require fewer passes over the soil by farming machinery, resulting in several advantages to the farmer.

The soil is less compacted, and therefore presents a better seedbed to promote plant growth. The looser soil retains moisture better, prevents run off, and provides for better root growth. Further, by leaving previous planting residue largely undisturbed, a protective covering for the soil is provided which increases water absorption and decreases weed growth. Still further, fewer passes over the field represents an obvious savings in manhours and operating costs.

The present invention allows a farmer to cultivate and fertilize the soil and plant seed in one pass over a residue-covered field by adding a paired fluted coulter assembly to pre-existing seed planting machinery.

2. Description of the Relevant Art

Various minimum till or no till planting devices are known. However, these devices are all integrated systems which do not contemplate the simple addition of the seedbed preparation assembly to the front of an ordinary seed planting unit. Such conventionally known systems are exemplified by the following.

Italian Pat. No. 525,840, issued in 1955, discloses a seeding machine capable of depositing fertilizer to different layers of soil. The apparatus is capable of concurrently breaking soil and disposing fertilizer at two distinct depths. The apparatus is comprised of a central frame assembly having at its leading portion a pivotable wheel assembly, and at its trailing portion a fixed trail roller. The frame is further fitted with fertilizer storage tanks and a number of blade/feeder extensions communicating with the base for each fertilizer storage tank. The blade/feeder extensions have two lengths, thus allowing the soil to be broken and fertilized at two depths.

Morrison, Jr. U.S. Pat. No. 3,362,361, entitled "PLANTING METHOD AND APPARATUS", discloses an in-line assembly having a forward pair of plain (as opposed to fluted) residue-removing discs, a trench-pressing wheel, a seed-distributing mechanism, a wheel to press seeds into the ground, and a following pair of plain covering discs to push earth over the seeds. Offset to one side is a fertilizer trench cutter and placement assembly. All of these components are supported off a central frame.

Krumholz U.S. Pat. No. 3,701,327, entitled "PLANTER AND METHOD OF PREPARING SOIL", discloses a fertilizer and planter assembly having a single forward-mounted fluted coulter for cultivation and residue removal. The Krumholz patent also includes the coulter and fertilizer elements as parts of a central frame apparatus. The Krumholz patent does not disclose any specific mounting or biasing assembly for the coulter unit in relation to the main frame assembly, nor the use of a dual coulter assembly for increased soil preparation efficiency.

Hardin et al. U.S. Pat. No. 4,187,916, entitled "SOIL CONDITIONING AND SEED BED PREPARING APPARATUS", discloses a main frame assembly having a subsoil trenching blade with following fertilizer delivery tube and a trench filling fluted coulter wheel. Mounted to the front of the main frame by unequal length control arms is a fluted coulter with exposed spring biasing means. On the rear of the main frame is mounted a flex arm on each side of which is mounted a fluted coulter assembly with a variety or adjustment means. The coulter assembly itself contains no biasing spring. The Hardin et al. patent does not disclose the optimal spatial relationship between the offset fluted coulter wheels, but merely indicates that such offset will prevent clogging of the assembly. The Hardin et al. patent further contemplates that a conventional seed planting mechanism will be attached to and pulled behind the entire soil conditioning and seedbed preparation apparatus.

Peterson et al. U.S. Pat. No. 4,244,306, entitled "MINIMUM TILLAGE PLANTER", discloses an apparatus for seeding of land which has been previously harvested. The apparatus comprises a wheeled framework supporting the apparatus for movement about a field. At the front of the framework is a row of chisels which produce tilled areas parallel to the path of movement of the framework. Each chisel carries a roller which breaks up any resulting clods of soil. Liquid fertilizer is directed to the tilled areas by delivering conduits extending along the rear of each chisel to their respective lower ends. Affixed on the rear of the Peterson frame is a seed distribution apparatus.

The problem with the current devices is that they do not provide an easily adjustable, self-contained seedbed preparation apparatus which is independently mountable to existing planting device frames. The present invention, by front mounting the paired coulter seedbed preparation assembly to an existing seed planting apparatus solves these problems with a low cost, high efficiency apparatus.

SUMMARY OF THE INVENTION

The disclosed invention provides a device capable of preparing a well-cleared and well-aerated raised seedbed with one pass of the apparatus over a field containing residue of prior plantings. This device also contemplates providing fertilizer to the seedbed.

The disclosed invention preferably uses paired, mirror-image fluted coulter assemblies for each seedbed, having adjustably attached fertilizer delivery tube assemblies which may contain optional knife-blades for additional soil cultivation.

Attachment of the two assemblies to an existing seed planting apparatus is accomplished by unequal length mounting brackets, thus ensuring that the coulter wheels will be longitudinally offset from each other for maximum efficiency. The mounting brackets allow coulter assembly attachment to the front, back, or underside of the front bar of an existing seed planting apparatus to provide a wide variety of placement options for the operator.

The assembly is spring biased towards the ground, and includes a spring housing assembly which may further function to receive the mounting brackets as an attachment point. The assembly may, by variously positioning the spring housing assembly within the adjustable mounting brackets, be adjusted for depth of cultivation. Lateral offset of the paired assemblies may be accomplished by variously and selectively locating the mounting brackets on the seed planting apparatus.

Fertilizer delivery tubes are attached to the apparatus behind the coulter wheels by means of a double-bend linkage arm attached to adjustable brackets. The double-bend linkage arm prevents soil and residue from clogging up in the fertilizer delivery tube area and thereby affecting the operation of the apparatus.

Thus, the operator is provided with various adjustments in the placement of the apparatus in relation to his/her preexisting equipment and also to the ground to be prepared for planting.

In accordance with the foregoing it is an object of the present invention to provide a farmer or gardener with a seedbed preparation apparatus which:

(1) easily attaches to existing planting equipment;

(2) is attachable to existing equipment in a variety of locations thereon;

(3) is adjustable for depth of cultivation;

(4) is adjustably biased towards the ground;

(5) provides a fertilizer delivery means selectively positionable on the seedbed preparation apparatus and is capable of holding a variety of fertilizer delivery systems;

(6) is a highly efficient, minimal maintenance seedbed preparation apparatus capable of operating in a field containing residue of prior plantings; and (7) is capable of seedbed preparation in one pass over the ground.

Other objects, advantages and salient features of the present invention will become apparent from the following detailed description, which, when taken in conjunction with the annexed drawings, discloses a preferred embodiment of the present invention.

BRIEF DESCRIPTION OF THE DRAWINGS

FIG. 3 illustrates a top plan of the paired coulter assemblies according to the preferred embodiment of the present invention.

FIG. 4 illustrates one attachment bracket for the apparatus.

FIG. 5 illustrates another attachment bracket for the apparatus.

FIG. 6 illustrates a second embodiment of the fertilizer delivery means.

FIG. 7 illustrates a side view of the device shown in FIG. 6.

FIG. 8 illustrates an injector for liquid fertilizer.

FIG. 9 illustrates a mounting clamp for the injector of FIG. 8.

FIG. 10 illustrates a side view of the fertilizer applicator of FIG. 6.

DETAILED DESCRIPTION OF THE PREFERRED EMBODIMENTS

Figure 1:
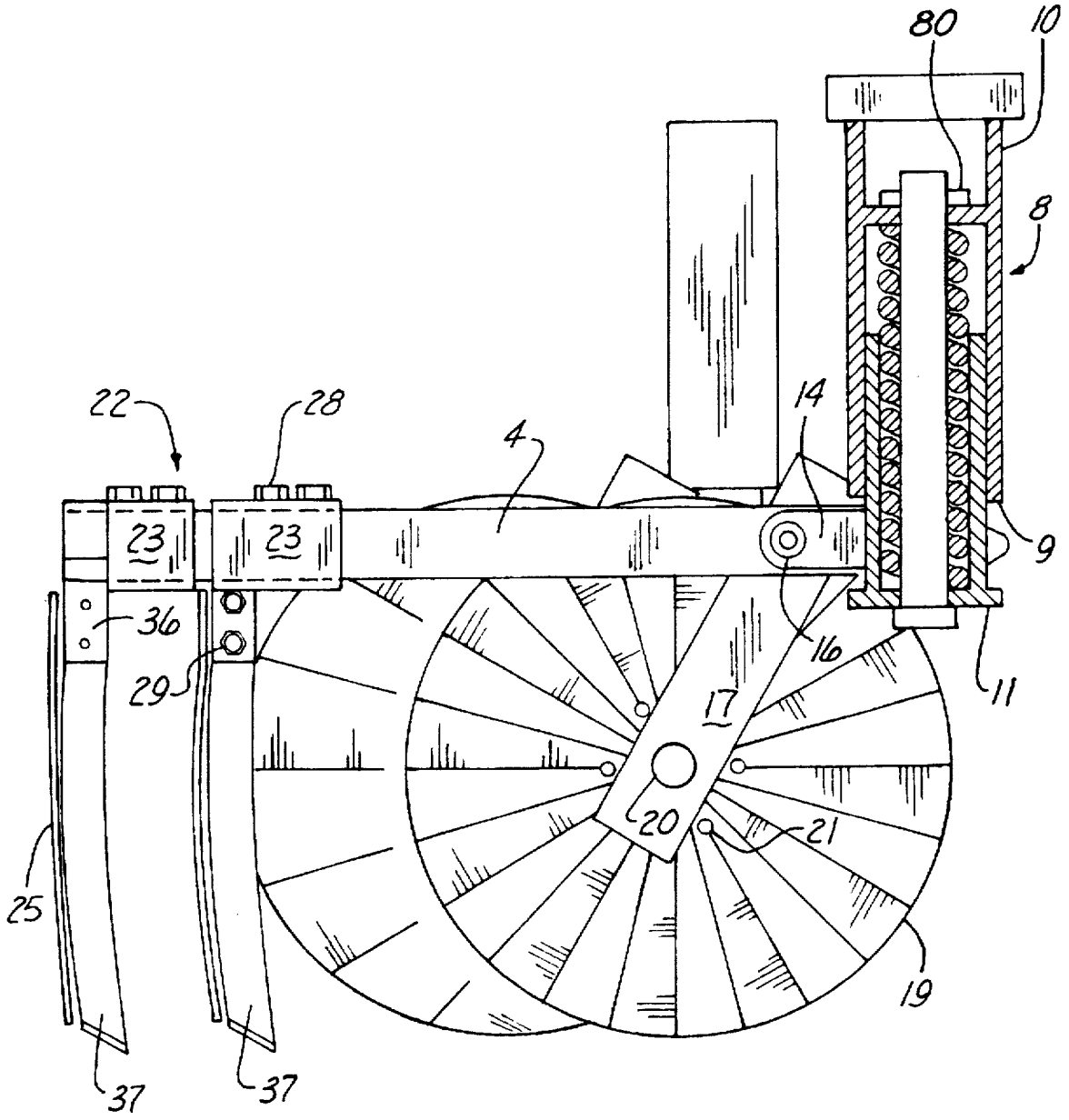
FIG. 1 illustrates a side elevation of the paired coulter assemblies according to the preferred embodiment of the present invention.
Figure 2:
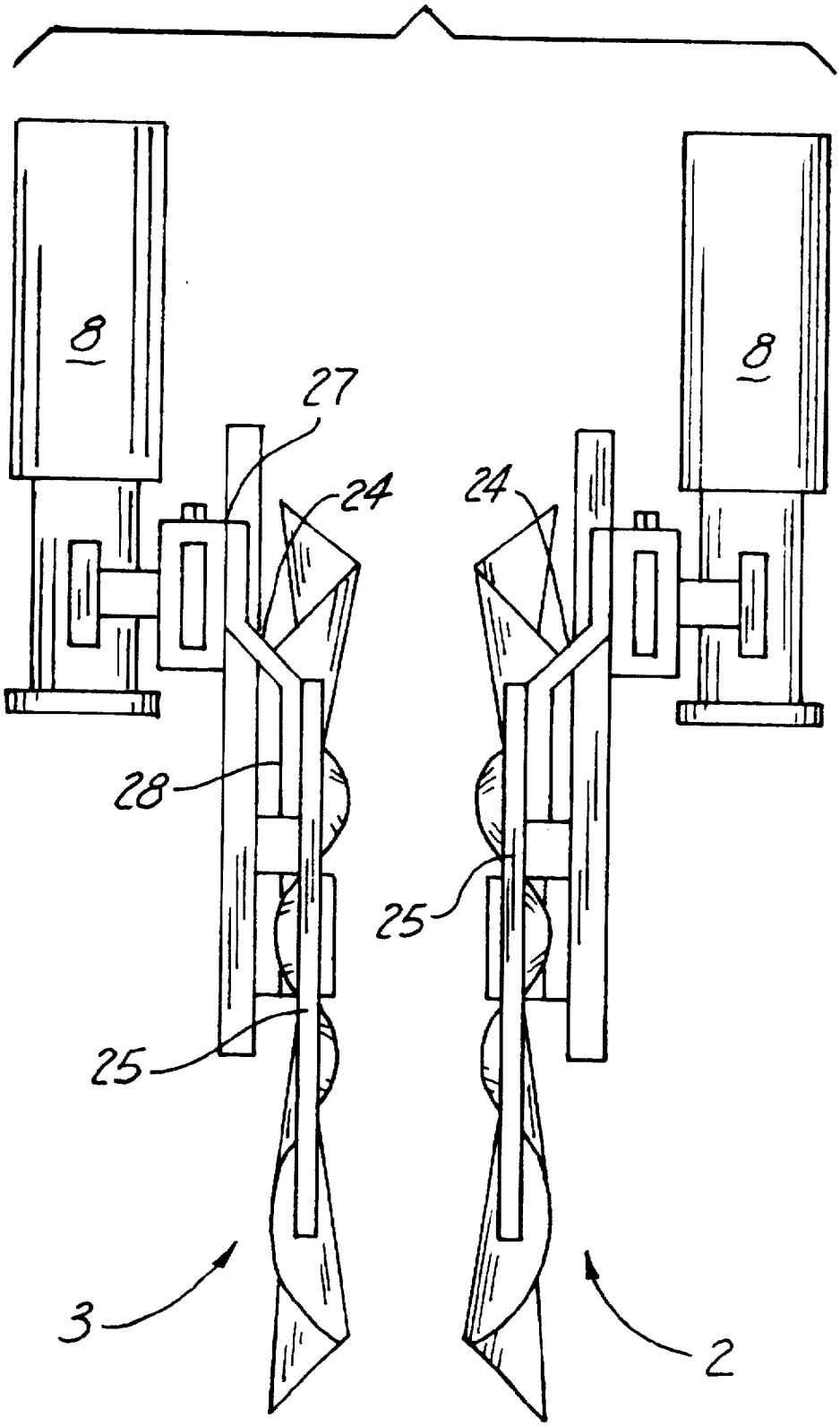
FIG. 2 illustrates a rear perspective view of the paired coulter assemblies according to the preferred embodiment of the present invention.

According to FIGS. 1–3 there is shown a pair of coulter assemblies with optional attached fertilizer delivery means which comprise a single seedbed preparation apparatus 1 to be attached to an existing farm implement and/or motive force (not shown). As the coulter assemblies 2, 3 are substantially mirror images of each other, it will be understood that a description of one coulter assembly may encompass its paired assembly in such a manner.

According to the preferred embodiment of the present invention there is a main support arm 4 which is preferably, but not necessarily, a substantially rectangular elongated steel bar. The main support arm lies in a substantially horizontal plane and has, for descriptive purposes, shown on assembly 3, a forward end 5 and a rearward end 6 as best seen in FIG. 3.

Attached to the main support arm 4 by means of a spring housing linkage arm 7 is the spring housing assembly 8 which encloses a spring 9 to bias the main support arm 4 downwardly towards the ground. The spring may be adjustably mounted by known means such as a central, threaded rod having an end nut 80 for tightening. In the preferred embodiment the spring 9 is preset for 2200 pounds of biasing force. The upper housing portion 10 of the spring housing unit may be sized to slidably receive the lower housing portion 11 when the spring 9 undergoes compression.

The upper housing portion 10 of the spring housing assembly 8 is elongated so that it may be received at various positions along its length in receiving hole 35 of mounting means 12 and 13 (FIGS. 4 and 5) which are affixed to a motive force such as a tractor or farm equipment. Preferably, but not necessarily, the spring housing assembly lies in the vertical plane perpendicular to main support arm 4.

The main support arm 4 is attached at its forward end 5 to the spring housing assembly 8 by means of a spring housing linkage assembly 7.

The spring housing linkage arm, as shown in the preferred embodiment, consists of two projections 14 and 15 lying perpendicular to each other and pivotally connected at their juncture 16.

The first projection 14 is attached to the spring housing assembly 8 and lies substantially parallel to the main support arm 4. The second projection 15 is attached to the main support arm 4 and lies substantially perpendicular thereto.

Attached to the main support arm 4 on the opposite side from the spring housing assembly 8 is the coulter wheel linkage arm 17. As shown in the preferred embodiment the coulter wheel linkage arm 17 extends rearwardly and downwardly at an oblique angle from the main support arm 4. At its downward end is attached a coulter receiving wheel 18 which is adapted to receive the coulter wheel 19. The coulter receiving wheel 18 rotates with its diameter in 2 substantially vertical plane about an axis 20 allowing the coulter wheel 19 affixed thereto to rotate in the same manner.

In the preferred embodiment the coulter wheel 19 is removably affixed to the coulter receiving wheel by a multiplicity of lug nuts 21.

According to the preferred embodiment the coulter wheel 19 provided is a fluted-type. The fluted coulter wheel 19 provides a highly efficient means for residue clearing and soil loosening.

In the preferred embodiment, fertilizer delivery means 22 is removably and adjustably attached to the rearward portion 6 of the main support arm 4. Further according to the preferred embodiment, the fertilizer delivery means comprises a fertilizer delivery attachment bracket 23 with tightening bolts 28 to which is attached a double-bend linkage arm 24. The double-bend linkage arm 24 supports a fertilizer delivery tube 25. The double-bend design of the linkage arm, in having a diagonal center 26 with an upper vertical member 27 and a lower vertical member 28, according to the preferred embodiment, helps to prevent residue and soil thrown backward and upward by the action of the coulter wheel 19 from clogging in the apparatus, and places the fertilizer delivery tube 25 in line behind coulter wheel 19.

The fertilizer delivery tube 25, in the preferred embodiment, is appended behind a knife bracket 36 capable of carrying a knife-blade cultivator 37. The knife bracket 36 allows for adjustability of the knife-blade in the vertical direction with securement means provided by securing bolts 29. Optionally, if the knife blade cultivator is not needed for additional cultivation of the soil beyond that provided by the coulter wheel 19 it may be removed and the knife bracket 36 used for holding a pressure spray fertilizer injector 60 (FIG. 8) or other desired attachment. The fertilizer injector may be secured to the apparatus by the bracket 70 shown in FIG. 9.

The fertilizer tube 25 is adapted to receive either dry or liquid fertilizer distributed from above to its upper end, from whence the tube allows the fertilizer to flow downward and be deposited in the seedbed area.

A fertilizer injector 60 may be used to apply liquids such as fertilizer or the like. The injector 60 comprises a nozzle 61, a coupler 62 and a tube 63. The nozzle 61 applies a pencil-thin stream of fertilizer or the like to the soil behind the coulter wheels. The injector 60 requires additional equipment such as a pump, to place the liquid under pressure. Preferably, but not necessarily, 20–50 PSI of pressure is applied to dispense the liquid.

The injector may be secured to bracket 36 by bracket 70. As shown in FIG. 9, bracket 70 includes a bend portion 72 and planar portion 73. Planar portion 73 includes hole 71 through which the injector 60 is passed. Bend portion 72 is secured into bracket 36 by bolts 29.

Mounting means for the paired coulter assemblies are shown in FIGS. 4 and 5 as mounting brackets of unequal length 12, 13.

Preferably, but not necessarily, there is a fixed length differential of approximately 10 inches between the brackets 12,13 when using fluted coulter wheels of approximately twelve inches radius. This mounting bracket length differential results in a longitudinal offset of the paired fluted coulter wheels giving them a self-cleaning action to prevent residue build up. Alternately, it is envisioned that the longer mounting bracket 13 may have means to adjust the length differential relative to the shorter bracket 12 to thereby more precisely position the longitudinal offset between the paired coulters.

The back plates 32, 33 of the mounting brackets 13, 12 have holes 34 for receiving threaded C-clamps (not shown) to affix the mounting brackets 12, 13 to a bar (not shown) of an existing farm implement such as a seed planter. Mounting brackets 12,13 may be affixed to a pre-existing farm implement bar such that the mounting bracket receiver holes 35 extend forward of the implement bar, behind the implement bar, or underneath the implement bar. Receiver holes 35 then receive the upper portion 10 of spring housing assembly 8 which is secured therein by receiver bolts 36.

The forward coulter assembly 47 which is the assembly attached to the shorter mounting means 12, is preferably, although not necessarily, placed as measured from the center of the fertilizer tube opening, two and one-half inches off a center line determined by seed placement. The trailing assembly is preferably placed approximately six inches off center line as measured by the above method.

The coulter wheels, running together in the above manner, remove residue left from prior plantings; grind, lift and aerate the soil, building a small ridge of soil between the coulter wheels. The offset arrangement of the fluted coulter wheels provides a self-cleaning action.

The knife blades may then follow, forming a trench on the outside of the soil ridge for receiving fertilizer placed by the immediately following fertilizer delivery tube. Alternatively, no knife may be used, a rolling disc drive may be used or a pressure fertilizer injector nozzle may be attached to knife bracket 36 in place of the knife blade cultivator as discussed previously.

A raised and fertilized seedbed is then awaiting the seed planting apparatus to which the seedbed preparation apparatus was attached.

A rolling-disc drive 50 may replace the knife blade 37. As shown in FIG. 6, a support arm 51 attaches to bracket 36 in place of the knife blade 37.

The rolling disc drive 50 applies dry fertilizer or nitrogen or the like into the seedbed area. A trench is formed by a wheel 53. Wheel 53 is supported by axle 54 attached to hub 52 which is supported by support arm 51. Attachement arm 56 extends rearwardly and upward to secure the fertilizer apparatus 55 in place. Support arm 51 is assembled at 5° off the face of the hub 52 to allow the fertilizer to be placed behind the wheel 53. Fertilizer apparatus 55 includes an inner tube portion 57 for the conveyance of the dry fertilizer. The fertilizer is despensed at the lower end 58 of member 55. As shown in FIG. 10, fertilizer apparatus 55 is of a tapered configuration and is offset from attachment arm 56.

The advantage of using the rolling disc drive 50 is that less energy is required to move the apparatus. The knife blades 37 tend to offer much greater resistance than the wheel 53 of the rolling disc drive.

Although there has been described what is at present considered to be the preferred embodiment of the present invention it will be understood that the invention may be embodied in other specific forms without departing from the spirit or essential characteristics thereof. The present embodiment is therefore considered in all aspects as illustrative, and not restrictive.

We claim:

1. A coulter wheel assembly, comprising:

a main support arm lying in a substantially horizontal plane and having a long and a short axis and a forward and a rearward end;

a spring housing assembly having a long axis in a substantially vertical plane;

a spring housing linkage arm having first and second projections substantially perpendicular to each other, said first and second projections being pivotally connected together;

said first projection attached to said spring housing assembly;

said second projection attached to said main support arm at said main support arm's forward end;

a spring adjustably mounted and enclosedly contained within said spring housing assembly such that it provides bias to keep said main support arm in a substantially horizontal plane;

a coulter wheel linkage arm attached to the main support arm at an oblique angle and extending substantially downward and rearward therefrom;

a coulter receiving wheel rotatably attached to said coulter linkage arm at said coulter linkage arm's downward portion such that said wheels axis of rotation is substantially perpendicular to both the main support arm's long axis and the long axis of spring housing assembly;

a fluted coulter wheel attached to said coulter receiving wheel;

a mounting means for adjustably securing said spring housing assembly to a device supplying a motive force; and means for applying fertilizer.

2. An assembly according to claim 1, wherein:

said spring is preset to apply 2200 pounds of bias force.

3. An assembly according to claim 1, wherein:

said means for applying fertilizer comprises a liquid fertilizer injector attached to the main support arm on the rearward end of said main support arm to apply a stream of fertilizer to a seedbed;

said fertilizer injector including a tube, a coupler and a nozzle.

4. An apparatus including at least two pairs of said coulter wheel assemblies according to claim 1, wherein:

said paired assemblies prepare a single seedbed; and said paired member assemblies of the apparatus being mirror images of one another.

5. An apparatus according to claim 4, wherein:

said mounting means for the paired assemblies comprises a pair of unequal length brackets for securably receiving said spring housing assemblies;

said brackets being of fixed lengths to provided a longitudinal offset between the coulter wheel assemblies.

6. The assembly according to claim 4, wherein:

said mounting means holds each of said coulter wheel assemblies an unequal length from said motive force.

7. The assembly according to claim 1, wherein said means for applying fertilizer further includes:

soil cutting means including a rolling disk-drive removably affixed to a bracket; and an adjustable holding means to variably position a pressure-type nozzle for fertilizer delivery.

8. The assembly according to claim 7, wherein:

said means for applying fertilizer is adjustably attached to main support arm and comprises;

attachment means for affixing said fertilizer delivery means to said main support arm;

a dry fertilizer delivery tube for placement in a trench formed by a soil cutting means; and said soil cutting means being substantially in line with said coulter wheel when said attachment means are affixed to said main support arm.

*9. A tillage device for attachment to an implement comprising:*

*a first coulter wheel assembly operably pivotally attached along a first substantially horizontal axis to said implement at a first position, said first coulter wheel assembly including a first ground engaging fluted coulter wheel operably rotatably attached to said assembly along a second substantially horizontal axis;*

*a second coulter assembly operably pivotally attached along a third substantially horizontal axis to said implement at a second position, rearwardly and to one side of said first position, said second coulter assembly being substantially a mirror image of said first coulter assembly and including a second ground engaging fluted coulter wheel operably rotatably attached along a fourth substantially horizontal axis to said second coulter wheel assembly, the pivotal attachment of the second coulter assembly being independent from the pivotal attachment of the first coulter wheel assembly;*

*wherein said first and second coulter wheels are disposed in an overlapping arrangement when viewed from a side view and wherein said first and second fluted coulters are disposed close enough together to thereby form a means for building a ridge of soil between the first and second fluted coulters as they rotate through the soil as the implement moves in a forward direction; and*

*wherein said first, second, third and fourth substantially horizontal axis are parallel to each other and substantially transverse to said forward direction.*

*10. The tillage device of claim 9 including a first spring assembly operably attached to said implement and operably attached to said first coulter assembly for biasing said coulter assembly downwardly.*

*11. The tillage device of claim 10 including a second spring assembly operably attached to said implement and operably attached to said second coulter assembly for biasing said second coulter assembly downwardly.*

*12. The tillage device of claim 9 or 11 wherein said first coulter assembly includes a first arm having a front portion, said first arm having a first ground engaging substance applicator affixed to the rear portion, said first substance applicator being disposed directly behind said first fluted coulter wheel.*

*13. The tillage device of claim 12 wherein said second coulter assembly includes a second arm having a front portion, said first arm having a second ground engaging substance applicator affixed to the rear portion, said second substance applicator being disposed directly behind said second fluted coulter wheel.*

*14. The tillage device of claim 11 including first means for adjusting the vertical position of said first spring assembly with respect to the implement; and*

*second means for adjusting the vertical position of said second spring assembly with respect to the implement.*

* * * * *